May 16, 1944.   C. E. MURRAY   2,349,189
BLADE HOLDING BLOCK FOR BORING BARS
Filed April 5, 1943

INVENTOR.
Clay E. Murray
BY Merrill M. Blackburn

Patented May 16, 1944

2,349,189

UNITED STATES PATENT OFFICE 2,349,189

BLADE HOLDING BLOCK FOR BORING BARS

Clay E. Murray, near Davenport, Iowa

Application April 5, 1943, Serial No. 481,950

14 Claims. (Cl. 77—56)

This invention relates to blade holding blocks for boring bars and has as its principal object increasing the accuracy of the cylindrical surface cut by a machine using a boring bar. A further and almost equally important object is the provision of an apparatus of the type indicated in which the blade holding blocks can be easily removed, or installed, when such is necessary. A further object is the provision of a reversible block which will hold the cutting blades so that they will cut equally accurately upon reversal of direction of rotation of the bar. My invention comprises such further objects, advantages, and capabilities as will hereafter appear and as are inherent in the construction disclosed herein.

In the drawing annexed hereto and forming a part hereof,

Figure 1:
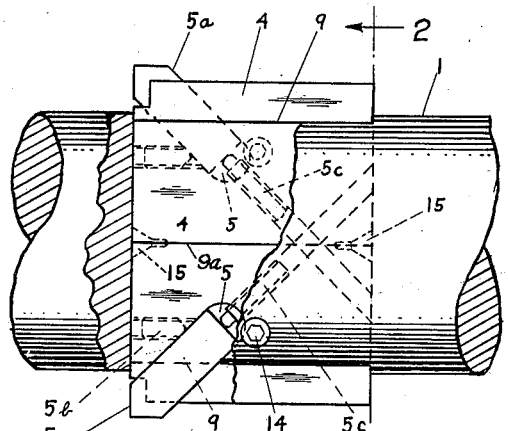
Fig. 1 represents a fragmentary section of a boring bar with a portion thereof broken away to disclose the blade-holding block therein.

Boring bars having transverse openings therethrough for the reception of blade-holding blocks are old and well known in the art but one of the difficulties with the prior structures is that of securing accurate positioning of the cutting blades so that the supposedly cylindrical surface cut thereby will be smooth and accurate. Another difficulty attendant upon the use of the structures of the prior art is in the matter of insertion of the blocks into the openings in the bar and removal thereof from such openings. These difficulties are very satisfactorily overcome by my present construction shown in the accompanying drawing in which the boring bar is designated by the numeral 1 and an opening extending diametrically thereof by the numeral 2. At opposite ends of this opening 2, the surface of the bar 1 has flat faces 3 cut thereon at opposite sides of the ends of the opening 2. These flat faces 3 have the same length as the length of the opening 2, measured longitudinally of the bar. The distance between the faces 3 upon opposite sides of the bar should be quite accurate in order that the surface bored may be likewise accurate when completed. It is also desirable that these flat faces be equally distant from the axis of the boring bar.

The blade holding block 4 has dovetailed grooves 5 cut in opposite faces for receiving and holding the cutting blades 5a, as shown most clearly in Fig. 1. These blades are held in adjusted position by means of set screws 5b, and may be adjusted longitudinally by means of adjusting screws 5c, after the set screws have been loosened. After a proper adjustment has been secured, the set screws are again tightened up to hold the blades in adjusted position.

As shown at 6, 7, and 8, the block 4 is formed with stepped surfaces, the surfaces 6 and 7 producing shoulders 9 which are spaced just far enough apart so that they will engage faces 3 upon opposite sides of the boring bar. The faces 8 upon the sides opposite the faces 7 are set back just far enough so that the block 4 may be turned about the axis of the boring bar sufficiently to make the shoulders 9 clear the faces 3 so that the block may be forced through the bar readily, thereby avoiding pounding and bruising it. As shown at 10, the faces of the block are beveled so that when the block is turned about the axis of the boring bar, in a clockwise direction as viewed in Fig. 2, the faces 10 will be parallel with the inside faces of the opening 2 extending diametrically of the shaft. The faces 6 and 10 at each end of the block are parallel and the planes of the faces 6 contact the edges of the shoulders 9a midway in the length of the block 4.

Figure 2:
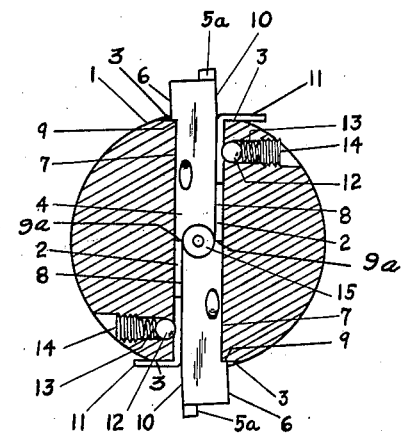
Fig. 2 represents a cross-section of the boring bar immediately adjacent the edge of the block, looking from the right hand side of Fig. 1 toward the right hand edge of the block and disclosing holding means for certain latches, the section being taken approximately along the plane indicated by the line 2—2, Fig. 1.

The shape of the block 4, as shown in Fig. 2, may be described more clearly by describing a possible method of manufacture. Let us assume this block to be a rectangular parallelopiped before being ground to form. Then by grinding away very slender wedge-shaped parts upon opposite sides of the block, there result the faces 7 and 8 and the shoulders 9 and 9a. The faces 6 and 10 which were parts of opposite parallel faces of the block are left undisturbed and the edges of the shoulders 9a lie in the same planes as the corresponding faces 6 and 10. From this it results that faces 6 and 10 are parallel and that the edges of the shoulders 9a lie in the planes defined by the flat faces 6 and 10 on the corresponding sides of the block.

In order to prevent chips from getting into the opening 2, between the faces 8 and the adjacent walls of the opening, pieces of felt or accurately fitted metal stops 11 may be provided. These should be the same length as the block 4 so that they will extend the same distance longitudinally of the boring bar as the opening 2, thus preventing chips from gaining access to said opening. While these blocks fit closely in the opening, they should, nevertheless, be readily removable therefrom so that, when it is desired to remove a block, it can be removed from the boring bar without being injured. The cutting ends of the blades 5a should be cut at just enough of an angle to clear the surface of the hole being bored, when the bar is rotated. This is, of course, well understood.

The existence of the shoulders 9 and the fact that they constantly contact the surfaces 3 during the boring operation insures both that the block will not rock longitudinally of the bar and will not move transversely thereof, both of which are desirable ends. When cutting is desired, when the boring bar rotates in the opposite direction, the block is removed and reversed so that the cutting blades 5a are positioned upon opposite sides of the block, thus positioning them for cutting when the bar is rotated oppositely, i. e., the right and left edges as viewed in Fig. 1 are interchanged. The openings 15 are provided for use with centers so that the block can be reversed on the centers for the grinding of the cutting edges of the blades 5a whereby to have them equally spaced from the axis of the bar.

The faces 3 and shoulders 9 may be cut diagonally to the faces of the opening 2 whereby to cause a wedging action during the boring operation so that the block will be held rigidly even though the distance between the shoulders 9 should be a few thousandths of an inch more than the distance between the faces. However, this construction is not regarded as being as accurate as that described above and shown in Fig. 2.

If it is desired to produce a less expensive structure, the adjustability of the cutting blades may be dispensed with by brazing the blades to the block or otherwise making them integral therewith. Then, as the blades are ground down, the block can be used for making the first or rough cut when performing the boring operation.

Figure 4:
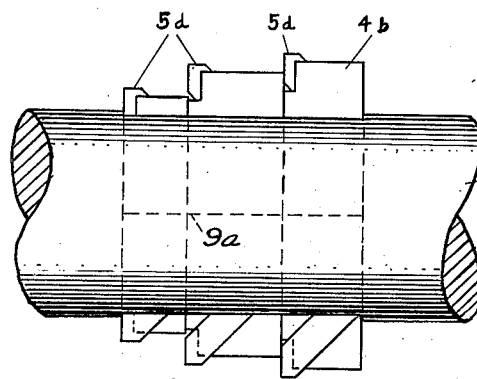
Fig. 4 shows an application of this invention in the making of several cuts simultaneously in a single boring operation.

Fig. 4 shows an arrangement for making a plurality of cuts, simultaneously, in a single operation. When using this arrangement, the first blades make a rough cut and then successive blades remove more of the metal, the last one making the finish cut. It is sometimes desirable to bore a hole having a stepped surface, that is, a hole having portions of progressively larger or smaller diameter, depending upon the direction one looks at the hole. This can be accomplished with the structure shown in Fig. 4. This may comprise a plurality of individual blocks set edge to edge in the opening 2, the blocks being of a size to cut progressively larger diameter bores as the boring operation continues. Alternatively, the blades may be mounted on a single block, being adjusted thereon to give the desired diameter of hole cut by the different blades.

Figure 3:
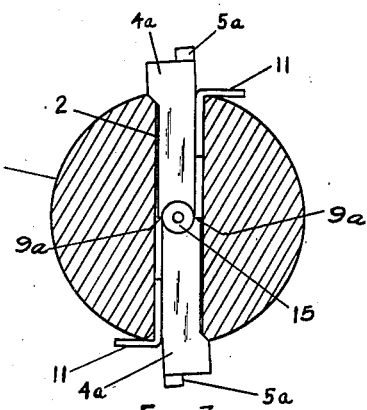
Fig. 3 shows a modified form of the structure shown in Figs. 1 and 2.

The blades 5d of Fig. 4 may be regarded as non-adjustable and as being integrally united to the blocks 4b which may be either separate or unitary. The diagonal arrangement of the faces 3 and 9 is shown in Fig. 3, in which the block is designated 4a.

Figure 5:
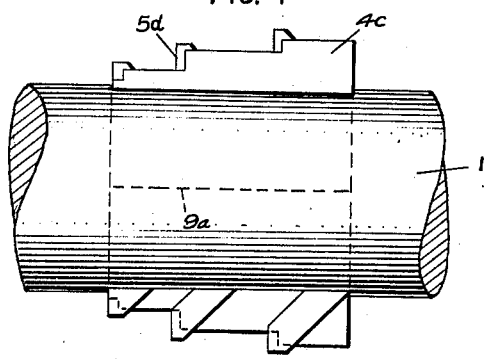
Fig. 5 shows a structure similar to Fig. 4, except that the cutter supporting block is unitary instead of being in three parts.

The metal stops 11 mentioned above are shown clearly in Figs. 2 and 3, in the former of which they are shown as being provided with indentations to be engaged by balls 12 which are pressed into the indentations by springs 13 kept in place by screw plugs 14. This arrangement makes it possible to keep all chips out of the opening 2, secure the block 4 against accidental removal from the boring bar, and yet have the stop 11 easily removable so that the block can be removed without injury. It will be understood that if the blades are integrally united to the blocks, as shown in Fig. 5, set screws 5b and 5c will be unnecessary.

It will of course be understood that such changes in the structure disclosed as come within the spirit of this invention and the scope of the appended claims are intended to be included therein.

Having now described my invention, I claim:

1. A cutter-blade holding-block for use in a boring bar provided with one or more diametrical openings extending longitudinally of the bar, comprising a rigid block of a size to substantially fit the length of the opening in the bar and be slidable therethrough and having two opposite faces stepped so that shoulders are formed on said opposite faces adjacent opposite ends, the shoulders being capable of resting simultaneously against the external surface of the bar whereby to prevent sliding of the block through the bar when the shoulders are in engagement with the surface of the bar.

2. A boring bar having diametrical substantially rectangular openings extending longitudinally of the bar, in combination with a blade-holding block having its end portions of a thickness substantially the same as the corresponding dimension of the holes through the bar, opposite faces of the block being stepped to render the part of the block other than the end portions thinner than said end portions and to provide shoulders removed somewhat from the ends of the block, said shoulders being spaced from each other a distance substantially the same as the diameter of the bar at the points of contact of the shoulders with the surface of the bar, and cutting blades carried by the block.

3. A boring tool comprising, in combination, a bar having at least one opening extending therethrough, diametrically thereof, and having flat faces upon opposite sides of the bar adjacent the ends of the opening, and a cutter block slidable in said opening and having its ends projecting outwardly beyond the surface of the bar, the end portions of the block being of a thickness not in excess of the corresponding dimension of the opening through the bar, thus rendering it possible to slide the block through the bar, opposite faces of the block being stepped so that shoulders are formed adjacent opposite ends of the block, said shoulders being spaced from each other a distance substantially equal to the distance between the flat faces on the bar to prevent shifting of the block with relation to the bar when the shoulders engage said flat faces.

4. A structure as defined by claim 3 in which the bar has flat faces upon opposite sides of both ends of the opening therethrough.

5. A boring bar cutter block having two opposite faces stepped to form shoulders adjacent the ends of the block, the maximum thickness of the block being substantially the same as the corresponding dimension of the opening through the bar, the separation of the shoulders being substantially the same as the distance between the surfaces of the bar contacted by the shoulders of the block when in boring position.

6. A boring bar having diametrical substantially rectangular openings extending longitudinally of the bar, in combination with a blade-holding block having its end portions of a thickness substantially the same as the corresponding dimension of the holes through the bar, opposite faces of the block being stepped to render the part of the block other than the end portions thinner than said end portions and to provide shoulders removed somewhat from the ends of the block, said shoulders being spaced from each other a distance substantially the same as the diameter of the bar at the points of contact of the shoulders with the surface of the bar, said block being oscillatable about the axis of the bar to carry the shoulders into or out of engagement with the external surface of the bar adjacent the extremities of the hole in which the block is located.

7. A cutter block for a boring bar, said block having two opposite faces stepped to form at least two shoulders upon each of said two faces, said block having a maximum thickness at its mid-point and its end portions substantially equal to the corresponding dimension of the opening into which the block is to be put.

8. A cutter block for a boring bar, said block having two opposite faces stepped to form at least two shoulders upon each of said two faces, said block having a maximum thickness at its mid-point and its end portions substantially equal to the corresponding dimension of the opening into which the block is to be put, corresponding portions of the surfaces of the block being parallel but the faces of the end portions from the outer shoulders to the ends of the block being inclined to the remaining faces at such an angle that the planes thereof contact the shoulders at the mid-portion of the block.

9. A cutter block for a boring bar, said block having two opposite faces stepped to form at least two shoulders upon each of said two faces, said block having a maximum thickness at its mid-point and its end portions substantially equal to the corresponding dimension of the opening into which the block is to be put and having dovetail channels extending diagonally inwardly for the reception of cutting blades, and cutting blades slidable in said channels for adjustment inwardly and outwardly.

10. A cutter block for a boring bar, said block having two opposite faces stepped to form at least two shoulders upon each of said two faces, said block having a maximum thickness at its mid-point and its end portions substantially equal to the corresponding dimension of the opening into which the block is to be put and having dovetail channels extending diagonally inwardly for the reception of cutting blades, and cutting blades slidable in said channels for adjustment inwardly and outwardly, said block having set screws for securing the cutting blades in adjusted position.

11. A cutter block for a boring bar, said block having two opposite faces stepped to form at least two shoulders upon each of said two faces, said block having a maximum thickness at its mid-point and its end portions substantially equal to the corresponding dimension of the opening into which the block is to be put and having dovetail channels extending diagonally inwardly for the reception of cutting blades, and cutting blades slidable in said channels for adjustment inwardly and outwardly, said block having screws engaging the inner ends of the cutting blades whereby said blades may be adjusted in said channels to be caused to extend more or less beyond the ends of the block.

12. A boring bar having diametrical substantially rectangular openings extending longitudinally of the bar, in combination with a blade-holding block having its end portions of a thickness substantially the same as the corresponding dimension of the holes through the bar, opposite faces of the block being stepped to render the part of the block other than the end portions thinner than said end portions and to provide shoulders removed somewhat from the ends of the block, said shoulders being spaced from each other a distance substantially the same as the diameter of the bar at the points of contact of the shoulders with the surface of the bar, said block being oscillatable about the axis of the bar to carry the shoulders into or out of engagement with the external surface of the bar adjacent the extremities of the hole in which the block is located, and closure means to be inserted in the openings between the walls of the block and the walls of the bar opening to keep chips from entering when the block is oscillated to carry the shoulders into engagement with the external surface of the bar.

13. A boring bar having diametrical substantially rectangular openings extending longitudinally of the bar, the surface of the bar at the extremities of an opening being flattened for engagement by a cooperating face of a blade-holding block, in combination with a blade-holding block having its end portions of a thickness substantially the same as the corresponding dimension of the holes through the bar, opposite faces of the block being stepped to render the part of the block other than the end portions thinner than said end portions and to provide shoulders removed somewhat from the ends of the block, said shoulders being spaced from each other a distance substantially the same as the diameter of the bar at the points of contact of the shoulders with the surface of the bar, and cutting blades carried by the block.

14. A structure as defined by claim 13 in which the flattened surfaces at the ends of the opening are arranged at an acute angle to the walls of the opening.

CLAY E. MURRAY.